June 14, 1927.
H. W. BUCKMAN ET AL
1,632,168
CONTROL VALVE FOR FLUID PRESSURE DEVICES
Filed July 23, 1925
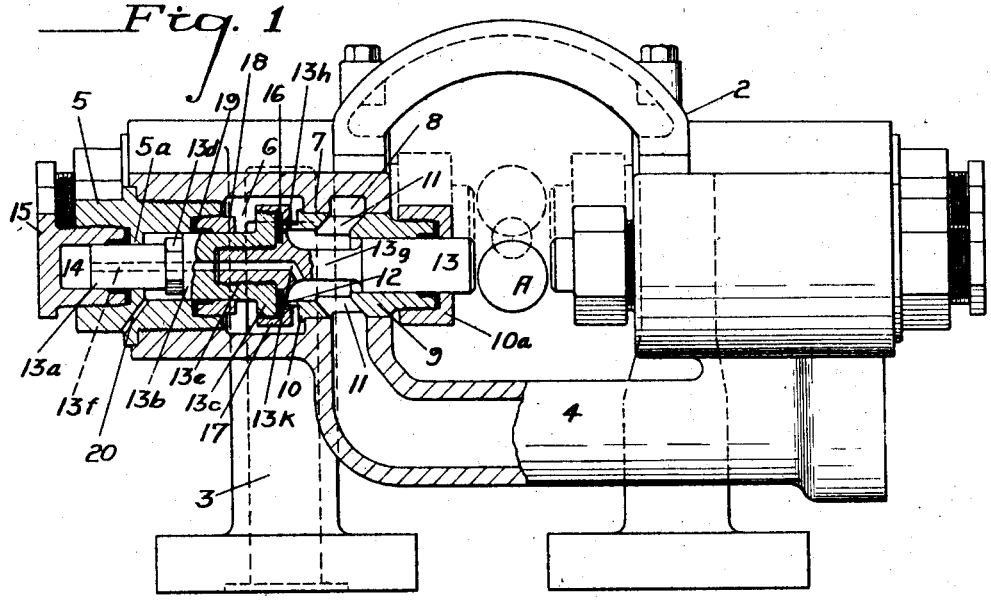
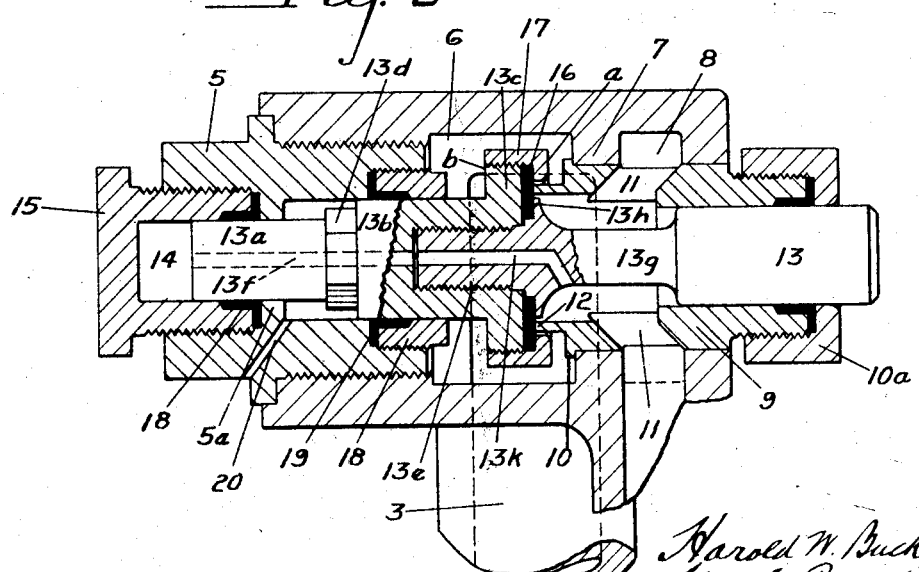
INVENTORS
BY
ATTORNEY.

Patented June 14, 1927.

1,632,168

UNITED STATES PATENT OFFICE.

HAROLD W. BUCKMAN AND HUGH PRENTICE, OF PITTSBURGH, PENNSYLVANIA, ASSIGNORS TO VANCE ENGINEERING COMPANY, OF PITTSBURGH, PENNSYLVANIA, A CORPORATION OF PENNSYLVANIA.

CONTROL VALVE FOR FLUID-PRESSURE DEVICES.

Application filed July 23, 1925. Serial No. 45,524.

This invention is for a control valve for fluid pressure devices, such for instance as hydraulic jacks, motors and the like.

The invention has for its principal objects to provide a valve particularly designed for use where heavy pressures are used, which may be easily opened, and which will be self-closing. A further important object of the invention is to provide a valve of unique construction which may be assembled with comparative ease.

The nature of the invention may be readily understood by reference to the accompanying drawings, wherein:

Fig. 1 is a view partly in section and partly in elevation of the entire valve assembly in connection with which the present invention is particularly adapted for use;

Fig. 2 is a longitudinal section, on a larger scale, of the parts shown in section in Fig. 1.

In the drawings, 2 designates the entire valve structure, of which the present invention is a part. In the structure, 3 is a water or fluid inlet pipe, and 4 designates the main outlet passage of the valve structure.

In the valve structure is a longitudinally extending bore, into the outer end of which is screwed a sleeve 5. In the casing, at the end of sleeve 5, is an annular chamber or enlargement 6 into which the inlet passage leads. Spaced inwardly from this chamber, and separated therefrom by an annular partition 7, is a similar chamber 8 with which the outlet passage communicates.

Closely fitted into the inner end of the bore is a second sleeve 9, which has an annular flange 10 thereon, engaging against portion 7 to limit the sleeve against further inward movement. This sleeve has ports 11 therein communicating with chamber 8. The forward end of the sleeve 9 is reduced at 12 to provide a valve seat.

Slidably guided at one end by sleeve 9, and at its other end by the annular rib 5ª of sleeve 5, is a two-section valve stem 13—13ª whose inner end 13 projects beyond the end of the sleeve 9 and through packing gland 10ª. This end of the stem is adapted to bear against an eccentric operating means A, of a type commonly employed in valves of this nature. The other end 13ª of the stem is received in the cavity 14 of a gland nut 15 screwed into the outer end of sleeve 5. The two sections 13 and 13ª screw together, as shown and as hereinafter described.

Section 13ª is enlarged at 13ᵇ and its inner end terminates in a flange or abutment 13ᶜ. At 13ᵈ is a surface to which a wrench may be applied. In the inner end of the member 13ª is an interiorly threaded socket 13ᵉ. A small passage 13ᶠ extends from the socket to the outer end of the stem to establish communication with cavity 14 in nut 15.

The valve stem section 13 is reduced at 13ᵍ, and has a flange 13ʰ thereon between its ends. The forward end of this stem section is threaded to be received in socket 13ᵉ. This section has a passage 13ᵏ therethrough, extending from a point back of the flange to the forwardmost end thereof, thus providing a passage from cavity 14 to the outlet side of the valve.

The abutment 13ᶜ forms the working surface of the valve, and fitted over the end thereof and confined thereagainst by flange 13ʰ, is a sealing washer or element 16. This element is further retained by means of a flanged collar 17 screwed onto the threaded periphery of the flange 13ᶜ. The exposed surface of the sealing element 16 normally bears against seat 12 of sleeve 9.

This construction of the valve element provides a very effective seal and one which may be easily replaced when necessary.

Screwed into the inner end of sleeve 5 is a bushing or gland 18 for retaining a packing 19 in sealing relation with part 13ᵇ of the member 13ª. In order to prevent the trapping of any fluid which may pass by the packing 19, a passage 20 is provided to drain this space.

It will be noted that the actual area of the valve seat 12 is relatively small. It will be seen, furthermore, that by reason of the arrangement of the abutment 13ᶜ and collar 17, the area of surface $a$ exposed to the pressure of fluid is only a little less than the area of surface $b$. The other surfaces of the valve element exposed to atmospheric pressure at opposite sides of the valve are equal. Therefore, substantially the only differential pressure to be overcome in opening the valve is the pressure corresponding to the pressure of the fluid on a surface of the area of the end of the valve seat.

This construction, therefore, provides a valve which may be opened with comparative ease. Once the valve is open, and pressure begins to build up in the outlet passage, this pressure will re-act through the passage 13ᶠ—13ᵏ in the valve stem to build up a pressure in cavity 14 to urge the valve shut, and such closing action will take place when the controlling handle for the valve is released. The self-closing action is entirely automatic and is effected without springs.

The entire construction is simple and may be easily assembled. All packings, as well as the sealing surface of the valve, are easily taken up and adjusted and can be easily repaired.

Various changes in the details of construction are within the contemplation of the invention and within the spirit of the appended claims.

We claim as our invention:

1. A fluid pressure valve including a housing having a bore extending therethrough, separate inlet and outlet chambers in the body in the form of annular enlargements of the bore, a sleeve in the inner end of the body having ports therethrough communicating with the outlet chamber and having a valve seat thereon, a sleeve in the other end of the body, a valve stem reciprocably mounted in the sleeves, said stem having two separable sections, one of which has an abutment thereon, a sealing washer on the end face of the abutment, a flanged collar on the periphery of the abutment for holding the sealing washer in place, said first section having an interiorly threaded socket therein, a threaded extension on the other section entered in the socket, said second member having a flange thereon intermediate its ends bearing against a portion of the sealing washer to retain it in place.

2. A fluid pressure valve comprising a housing having an opening extending therethrough, annular recesses in the opening arranged side by side and providing inlet and outlet chambers, means providing a valve seat between the inlet and outlet chambers, a valve stem in the opening and longitudinally movable therein, said valve stem having an exposed portion at one end and a reduced terminal at the other end, a bushing surrounding said other end providing a relatively small counter-pressure chamber, the stem having a central port opening from the reduced end wherein the counter-pressure chamber to the outlet chamber, an abutment on the stem intermediate its ends and in the fluid inlet chamber, a sealing element on the side face of the abutment and adapted to contact with the valve seat, means on the abutment for retaining said sealing means in place, said abutment and retaining means being of greater diameter than the diameter of the valve seat and having its opposite faces subject to the fluid pressure in the inlet chamber.

3. A fluid pressure valve comprising a casing having a bore therethrough, annular enlargements in the bore providing inlet and outlet chambers, said chambers being separated by an annular flange, a sleeve inserted in the bore having one end providing a valve seat and being ported intermediate its ends to communicate with the outlet chamber, a second sleeve screwed into the outer end of the bore and having a packing gland near its innermost end, a hollow nut closing the outer end of the sleeve, a valve stem slidably supported in the two sleeves, a valve element on the stem for cooperation with the seat, said valve stem having a passage therethrough from the outlet side of the valve element to the cavity in said hollow nut, into which cavity the stem extends, whereby a valve closing pressure may be built up in the cavity.

In testimony whereof we hereunto affix our signatures.

HAROLD W. BUCKMAN.
HUGH PRENTICE.